United States Patent
Chen

(10) Patent No.: US 10,308,174 B2
(45) Date of Patent: Jun. 4, 2019

(54) TRUCK BED LIGHTING ASSEMBLIES

(71) Applicant: FORD GLOBAL TECHNOLOGIES, LLC, Dearborn, MI (US)

(72) Inventor: Linsheng Chen, Rochester Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 20 days.

(21) Appl. No.: 15/729,737

(22) Filed: Oct. 11, 2017

(65) Prior Publication Data

US 2019/0106053 A1 Apr. 11, 2019

(51) Int. Cl.
| | |
|---|---|
| *B60Q 3/30* | (2017.01) |
| *B60Q 3/40* | (2017.01) |
| *B60Q 3/60* | (2017.01) |
| *G02B 27/30* | (2006.01) |
| *F21V 5/04* | (2006.01) |
| *F21V 7/00* | (2006.01) |
| *B60Q 3/80* | (2017.01) |
| *F21Y 115/10* | (2016.01) |

(52) U.S. Cl.
CPC ............... *B60Q 3/30* (2017.02); *B60Q 3/40* (2017.02); *B60Q 3/60* (2017.02); *B60Q 3/80* (2017.02); *F21V 5/04* (2013.01); *F21V 7/0091* (2013.01); *G02B 27/30* (2013.01); *F21Y 2115/10* (2016.08)

(58) Field of Classification Search
CPC ........................................................ B60Q 3/30
See application file for complete search history.

(56) References Cited

U.S. PATENT DOCUMENTS

| | | | |
|---|---|---|---|
| 4,303,965 A | 12/1981 | Vile et al. | |
| 6,547,423 B2 * | 4/2003 | Marshall | F21V 5/04 |
| | | | 257/E33.072 |
| 6,786,623 B2 * | 9/2004 | Snyder | B60Q 3/30 |
| | | | 362/485 |
| 7,006,306 B2 | 2/2006 | Falicoff et al. | |
| 7,834,750 B1 * | 11/2010 | Hertz | B60Q 1/2692 |
| | | | 340/468 |
| 8,305,225 B2 | 11/2012 | Hefright et al. | |
| 9,423,092 B1 | 8/2016 | Deyaf et al. | |
| 2015/0336503 A1 * | 11/2015 | Hausler | B60Q 1/0041 |
| | | | 362/485 |
| 2017/0028905 A1 | 2/2017 | Irgang et al. | |

* cited by examiner

*Primary Examiner* — Sean P Gramling
(74) *Attorney, Agent, or Firm* — Carlson, Gaskey & Olds

(57) ABSTRACT

A vehicle includes a truck bed and a lighting assembly configured to illuminate the truck bed. The lighting assembly includes a light source, a collimator positioned in front of the light source, and an outer lens positioned in front of the collimator. The collimator and the outer lens establish a lens arrangement having a unitary body. The light generated by the light source is collected within the collimator and is directed at a downward angle toward a floor of the truck bed by the outer lens.

18 Claims, 4 Drawing Sheets

TRUCK BED LIGHTING ASSEMBLIES

TECHNICAL FIELD

This disclosure relates to lighting assemblies for uniformly illuminating truck beds.

BACKGROUND

A pickup truck is a type of vehicle that includes a truck bed that serves as a cargo space for transporting various types of items. During nighttime conditions, the truck bed and any items stored therein can be hard to see. Some truck beds are equipped with lighting assemblies for illuminating the truck bed. However, known lighting assemblies typically do not uniformly illuminate the truck bed.

SUMMARY

A vehicle according to an exemplary aspect of the present disclosure includes, among other things, a truck bed and a lighting assembly configured to illuminate the truck bed. The lighting assembly includes a light source, a collimator positioned in front of the light source, and an outer lens positioned in front of the collimator. The collimator and the outer lens establish a lens arrangement having a unitary body.

In a further non-limiting embodiment of the foregoing vehicle, the vehicle is a pickup truck, and the truck bed establishes a cargo area of the pickup truck.

In a further non-limiting embodiment of either of the foregoing vehicles, the light source is a light emitting diode.

In a further non-limiting embodiment of any of the foregoing vehicles, the light emitting diode is received within a recess of the collimator.

In a further non-limiting embodiment of any of the foregoing vehicles, the collimator is a total internal reflection (TIR) collimator.

In a further non-limiting embodiment of any of the foregoing vehicles, the TIR collimator is configured to collect light generated by the light source and direct the light toward the outer lens.

In a further non-limiting embodiment of any of the foregoing vehicles, the outer lens includes integrated optics for spreading light received from the collimator.

In a further non-limiting embodiment of any of the foregoing vehicles, the integrated optics include a plurality of fluted surfaces.

In a further non-limiting embodiment of any of the foregoing vehicles, each of the plurality of fluted surfaces is pillow shaped.

In a further non-limiting embodiment of any of the foregoing vehicles, the integrated optics are configured to direct light at a downward angle relative to a centerline axis of the lens arrangement.

In a further non-limiting embodiment of any of the foregoing vehicles, the collimator includes a convex surface and first and second walls inclined away from the convex surface.

In a further non-limiting embodiment of any of the foregoing vehicles, the outer lens includes first and second walls that connect to the first and second walls of the collimator.

In a further non-limiting embodiment of any of the foregoing vehicles, the lens arrangement is supported within a housing.

In a further non-limiting embodiment of any of the foregoing vehicles, a second lens arrangement is supported within the housing. The lens arrangement directs light in a first direction from the housing and the second lens arrangement directs light in a second, different direction from the housing.

In a further non-limiting embodiment of any of the foregoing vehicles, the unitary body includes a molded, single-piece, monolithic structure.

A method according to another exemplary aspect of the present disclosure includes, among other things, generating light with a light source of a truck bed lighting assembly, collecting the light within a total internal reflection collimator of the lighting assembly, and directing the light at a downward angle toward a floor of the truck bed with an outer lens of the lighting assembly.

In a further non-limiting embodiment of the foregoing method, the light from the light source is automatically generated when a tailgate of the truck bed is moved to an open position.

In a further non-limiting embodiment of either of the foregoing methods, the light is turned off when the tailgate is moved to a closed position.

In a further non-limiting embodiment of any of the foregoing methods, the method includes illuminating a different section of the floor of the truck bed with a second truck bed lighting assembly.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details lighting assemblies for uniformly illuminating truck beds or other vehicle cargo areas. An exemplary vehicle includes. These and other features of this disclosure are described in greater detail in the following paragraphs of this detailed description.

Figure 1:
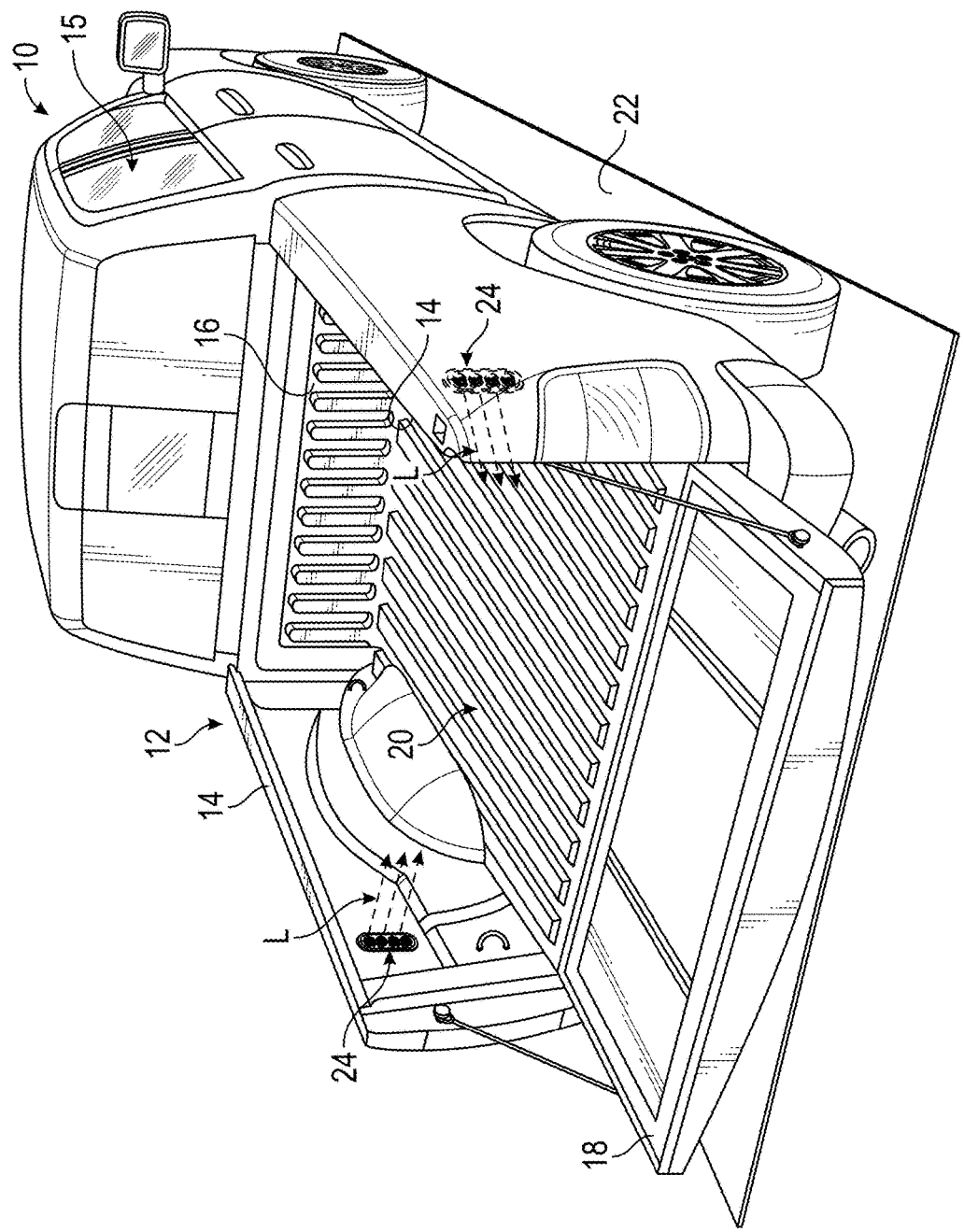
FIG. 1 illustrates a vehicle equipped with a truck bed lighting system.

FIG. 1 schematically illustrates a vehicle 10. In the illustrated embodiment, the vehicle 10 is a pickup truck. While a truck is pictured, other vehicles could also benefit from the teachings of this disclosure. For example, the exemplary lighting assemblies of this disclosure could be used to illuminate any vehicle cargo space.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 includes a truck bed 12 that establishes a cargo area for storing and hauling cargo at a rear location of the vehicle 10. The truck bed 12 is generally rearward of a passenger cabin 15 of the vehicle 10 and includes a floor 20 extending between a pair of longitudinally extending side walls 14, a laterally extending front wall 16, and a tailgate 18.

The tailgate 18 is moveable between a closed position (not shown) and a deployed or open position. When in the closed position, the tailgate 18 generally encloses an end of the truck bed 12 that is opposite from the front wall 16 to prevent items from sliding out of the truck bed 12. The tailgate 18 may be pivoted from the closed position to the open position to provide access to the truck bed 12. When in the open position, the tailgate 18 is generally parallel to a ground level 22 such that cargo can be loaded and/or unloaded from the truck bed 12.

During certain conditions, such as nighttime conditions or other low visibility conditions, it may be desirable to illuminate the truck bed 12 in order to visualize the contents stored therein. The vehicle 10 may therefore be equipped with a truck bed lighting system for illuminating portions of the truck bed 12. The truck bed lighting system may include one or more lighting assemblies 24 adapted to emit light L for illuminating the truck bed 12. In an embodiment, the truck bed lighting system includes two lighting assemblies 24. For example, one lighting assembly 24 may be mounted to each side wall 14 of the truck bed 12 at a location that is near a junction between the side wall 14 and the tailgate 18. However, the lighting assemblies 24 could be mounted at any location of the truck bed 12, and the truck bed lighting system could include a greater or fewer number of lighting assemblies within the scope of this disclosure.

Figure 2:
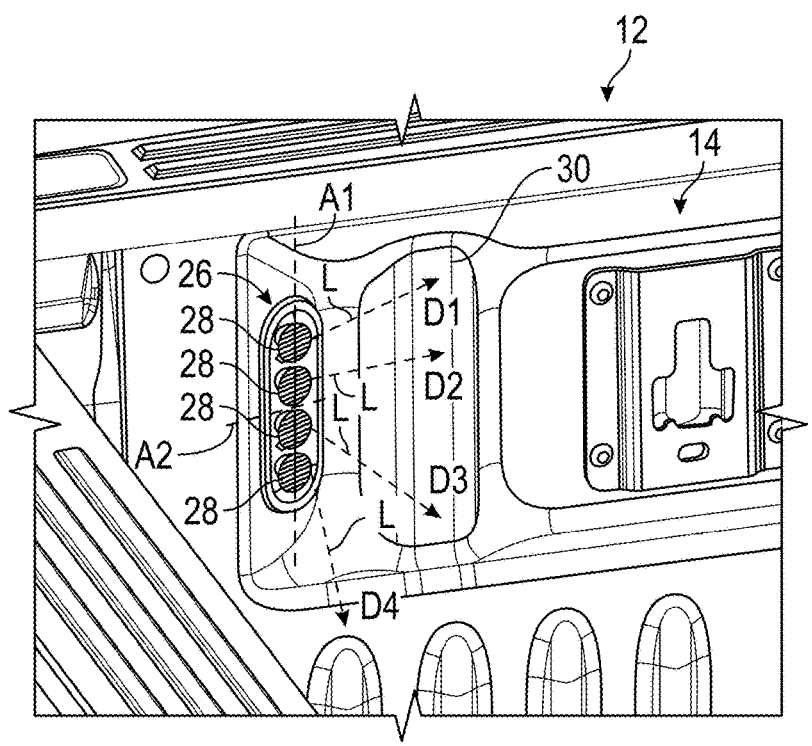
FIG. 2 is a blown up view of a lighting assembly of the truck bed lighting system of FIG. 1.

Referring now to FIGS. 1 and 2, each lighting assembly 24 may include a housing 26 and one or more lens arrangements 28 supported within the housing 26. In an embodiment, the housing 26 is mounted within an inner paneling 30 of the side wall 14 of the truck bed 12. The housing 26 may be mounted using a snap-fit connection, fasteners, or via any other conventional mounting technique. When mounted, the housing 26 generally faces toward the opposite side wall 14 of the truck bed 12. In the illustrated embodiment, the lighting assembly 24 includes four lens arrangements 28 supported within the housing 26. However, each lighting assembly 24 could include a greater or fewer number of lens arrangements within the scope of this disclosure.

Each respective lens arrangement 28 of the lighting assembly 24 may be positioned relative to the housing 26 in order to emit light in a direction that is a unique from the light that is emitted by the other lens arrangements 28 of the lighting assembly 24. The positioning of each lens arrangement 28 relative to the housing 26 may be different from the other lens arrangements 28 in terms of the angle that the lens arrangement 28 is positioned relative to at least one of a longitudinal axis A1 and a transverse axis A2 of the housing 26 (i.e., tilt up/down, tile left/right, etc.). As schematically depicted in FIG. 2, for example, each lens arrangement 28 can be arranged relative to the housing 26 such that light L is emitted in each of four general directions from the housing 26: a first direction D1 (i.e., from a first of the lens arrangements), a second direction D2 (i.e., from a second of the lens arrangements), a third direction D3 (i.e., from a third of the lens arrangements), and a fourth direction D4 (i.e., from a fourth of the lens arrangements). Arranging the lens arrangements 28 in this manner helps achieve a more uniform illumination of the truck bed 12.

Figure 3:
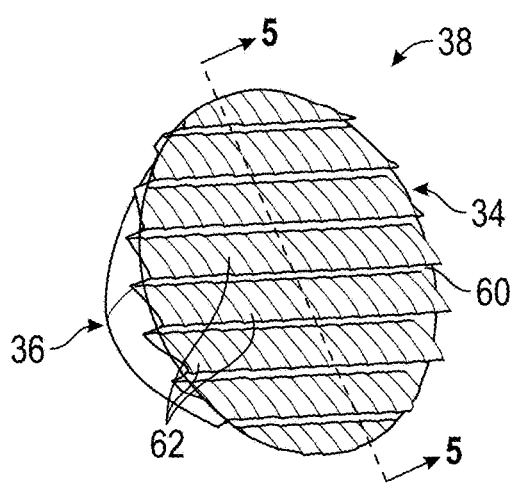
FIG. 3 is a front, perspective view of a lens arrangement of a truck bed lighting assembly.
Figure 4:
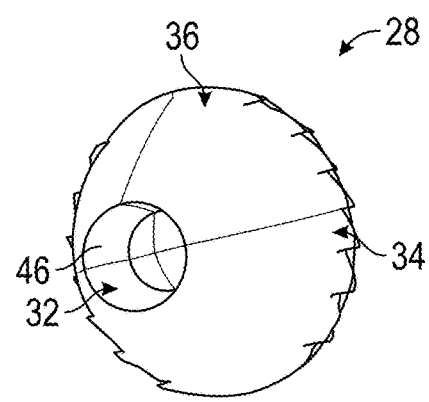
FIG. 4 is a rear, perspective view of the lens arrangement of FIG. 3.
Figure 5:
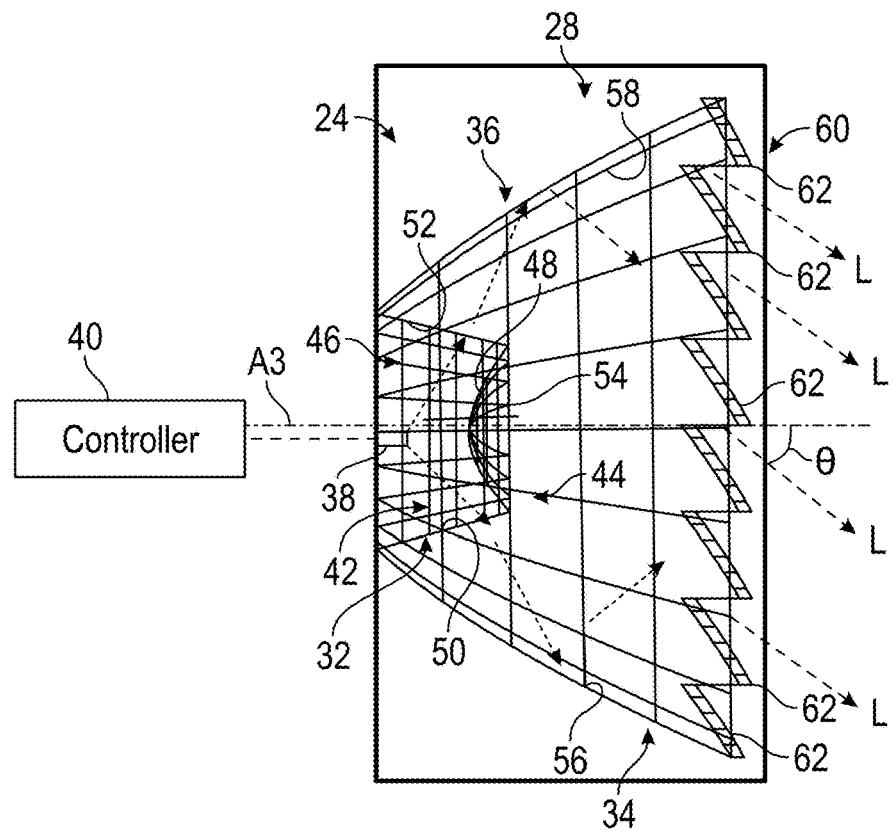
FIG. 5 is a cross-sectional view of the lens arrangement of FIG. 3.

FIGS. 3, 4, and 5, with continued reference to FIGS. 1 and 2, illustrate an exemplary lens arrangement 28 of the lighting assembly 24. In an embodiment, each lens arrangement 28 of the lighting assembly 24 of FIG. 2 includes a design similar to the design of the lens arrangement of FIGS. 3-5.

The lens arrangement 28 may include a collimator 32 and an outer lens 34. As discussed in greater detail below, the collimator 32 is configured to collect the light emitted by a light source 38 (see FIG. 5) of the lighting assembly 24, and the outer lens 34 is configured to direct the light in a downward direction toward the floor 20 of the truck bed 12 in a manner that uniformly illuminates the truck bed 12.

In an embodiment, the light source 38 is a light emitting diode (LED). However, other light sources could also be utilized within the scope of this disclosure. In addition, although only a single light source 38 is shown, it should be understood that each lens arrangement 28 could incorporate additional light sources depending on the lighting requirements of the particular truck bed being illuminated.

The light source 38 is controlled by a controller 40. The controller 40 may control the light source 38 such that the light source 38 is turned on only when the tailgate 18 is moved to the open position (see FIG. 1). Thus, when the tailgate 18 in the open position, the truck bed 12 is illuminated. When the tailgate 18 is returned to the closed position, the truck bed 12 is not illuminated for conserving power. The light source(s) 38 could be controlled to turn on and off in response to other conditions. The control strategy for controlling the light source 38 is not intended to limit this disclosure.

The collimator 32 is generally located between the light source 38 and the outer lens 34. The collimator 32 includes an inner surface 42 that faces toward the light source 38 and an outer surface 44 that faces toward the outer lens 34 and is generally opposite the inner surface 42. The inner surface 42 establishes a recess 46, and as is best shown in the cross-sectional view of FIG. 5, the light source 38 is at least partially arranged in the recess 46. The inner surface 42 may include a convex surface 48, as viewed from the perspective of the light source 38, and first and second walls 50, 52 that gradually incline away from the convex surface 48. The first and second walls 50, 52 allow light to pass therethrough.

In an embodiment, the outer surface 44 includes a planar, flat surface 54. The planar flat surface 54 is connected to the first and second walls 50, 52, which gradually incline away from the planar, flat surface 54. In an embodiment, the walls 50, 52 are arranged to bend light in such a way that the collimator 32 is a total internal reflection (TIR) collimator, meaning that all the light entering the collimator 32 through the inner surface 42 exits through the outer surface 44.

In yet another embodiment, the collimator 32 is substantially symmetrical about a centerline axis A3. In particular, when viewed in cross-section (e.g., FIG. 5), the centerline axis A3 substantially bisects the convex surface 48 and the planar, flat surface 54. Further, the planar, flat surface 54 is generally perpendicular to the centerline axis A3.

The centerline axis A3 also bisects the outer lens 34. The outer lens 34 is transparent and allows light to pass from the collimator 32 to the truck bed 12. Light passing through the outer lens 34 is not reflected or refracted relative to the collimator 32. The outer lens 34 may include first and second walls 56, 58 that connect between the collimator 32 and an outer surface 60 of the outer lens 34. The walls 56, 58 are arranged to reflect light toward the outer surface 60 of the outer lens 34.

The outer surface 60 of the outer lens 34 includes integrated optics for evenly spreading the light received from the collimator 32 in a horizontal or a vertical direction. The integrated optics may be provided by forming one or more textured surfaces on the outer surface 60. In an embodiment, the integrated optics include a plurality of fluted surfaces 62 formed in the outer surface 60. The fluted surfaces 62 may be molded into the outer surface, for example. In an embodiment, the fluted surfaces 62 are pillow shaped and appear as horizontal or vertical lines in the outer surface 60. The fluted surfaces 62 may be configured and arranged such that light L that exits through the outer lens 34 is directed at a downward angle α relative to the centerline axis A3 (see FIG. 5). The downward angle Θ is a negative angle relative to the centerline axis A3. The light L is therefore directed toward the floor 20 of the truck bed 12.

After the light beams from the light source 38 pass through the collimator 32, the light beams become collimated light, and when the collimated light strikes the outer lens 34, it can spread left and right, or horizontally. The spread angle can be modified by changing the parameters of the outer lens 34. In the meantime, when the collimated light strikes the integrated optics of the outer lens 34, the light is bent downwardly to strike on the truck bed 12. The downward angle can be adjusted by changing the design of the integrated optics.

The collimator 32 and the outer lens 34 together establish a unitary body 36 of the lens arrangement 28. In an embodiment, the unitary body 36 is a single-piece, monolithic structure. The collimator 32 and the outer lens 34 may be molded (e.g., injection molded) together to form the single-piece, monolithic structure.

Figure 6:
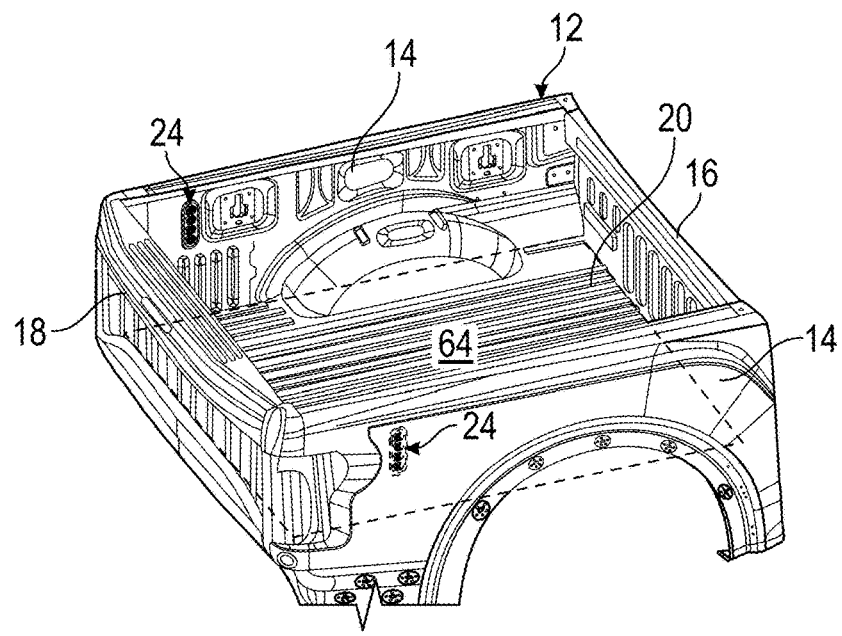
FIG. 6 illustrates a truck bed uniformly illuminated by a lighting system according to an embodiment of this disclosure.

FIG. 6 schematically illustrates the uniform illumination of the truck bed 12 that can be achieved by using the truck bed lighting system described above. In this embodiment, the truck bed lighting system includes two lighting assemblies 24, with one lighting assembly disposed in each side wall 14 near where the side wall 14 meets the tailgate 18 (i.e., near an end of the side wall 14 that is opposite from the front wall 16). The lens arrangements 28 of the lighting assemblies 24 provide bright, uniform illumination, as schematically shown at 64, of the floor 20 of the truck bed 12.

Figure 7:
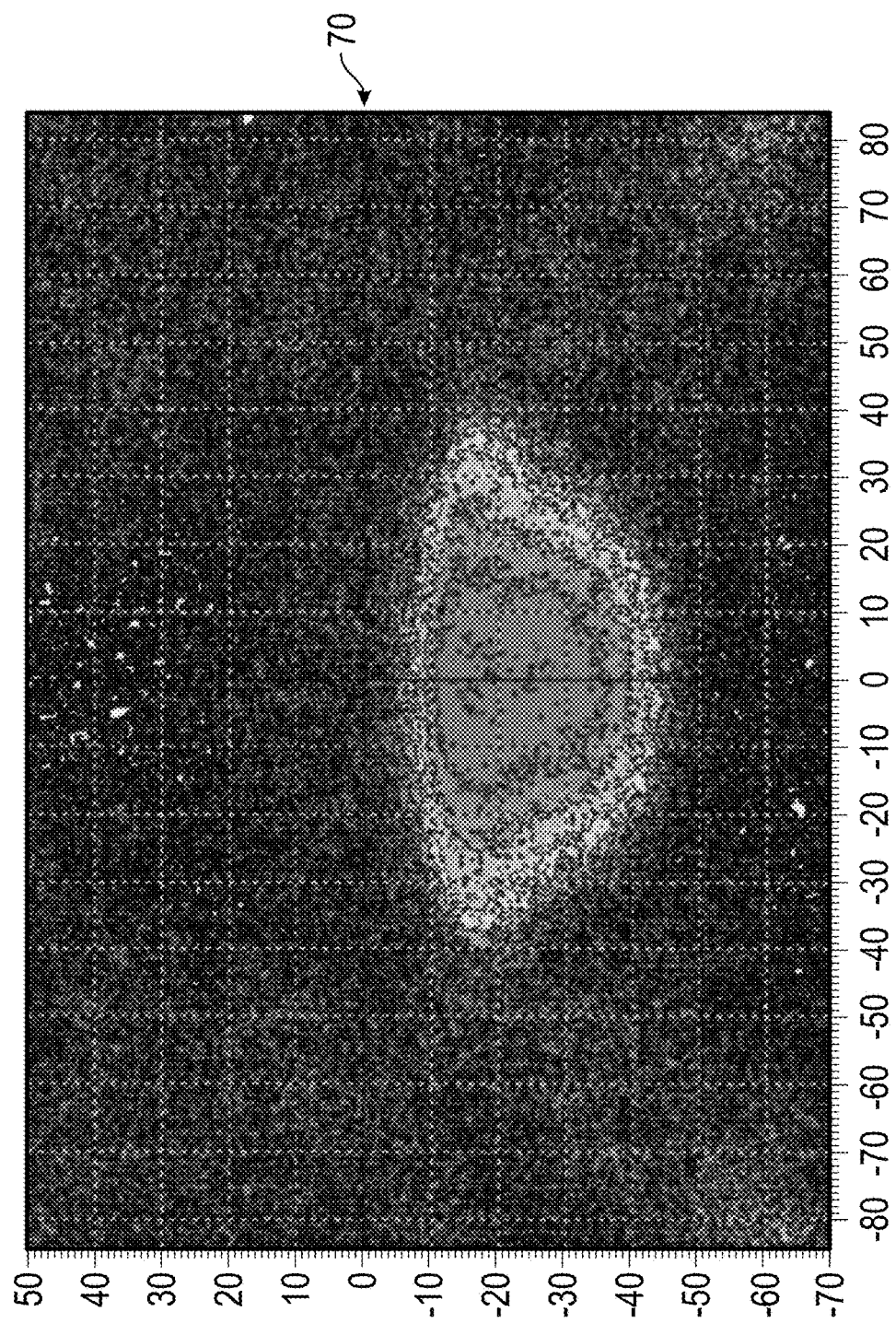
FIG. 7 is an intensity plot that graphically illustrates the illumination achieved by the exemplary truck bed lighting assemblies of this disclosure.

FIG. 7 is an intensity plot 70 achieved by the exemplary lighting assemblies 24 of this disclosure. As shown by the intensity plot 70, the lighting assembly 24 provides a highly efficient illumination in which nearly all the light generated by the lighting assembly 24 is directed onto the desired region.

As shown by the plot 70, no light will shoot up to cause glare to the driver or passengers of the vehicle 10. The lens parameters can be further changed to spread more light horizontally and vertically by overlapping light from two corners of the vehicle 10. Thus, uniform illuminance can be achieved on the truck bed 12. By tilting the lens arrangements 28 left and right, the lighting assembly 24 can further achieve the uniform illuminance on the truck bed 12 and achieve high optical efficiency and reduced glare to the driver or passengers.

The truck bed lighting assemblies of this disclosure utilize lens arrangements that collect all the light emitted from the light source and then spread the light using optics formed on the outer lens for uniformly illuminating the truck bed. The lighting assemblies achieve a high collection efficiency while reducing glare. The assemblies further provide a stylish and cost effective design for effectively illuminating truck beds.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle, comprising:
a truck bed including a side wall and a tailgate; and
a lighting assembly mounted near a junction between the side wall and the tailgate, the lighting assembly including:
a total internal reflection collimator; and
an outer lens including a plurality of pillow shaped fluted surfaces positioned in front of a flat outer surface of the collimator,
wherein the collimator and the outer lens establish a unitary body.

2. A vehicle, comprising:
a truck bed; and
a lighting assembly configured to illuminate the truck bed, the lighting assembly including:
a light source;
a collimator positioned in front of the light source; and
an outer lens including a plurality of fluted surfaces positioned in front of a flat outer surface of the collimator, wherein the collimator and the outer lens establish a lens arrangement having a unitary body,
wherein the flat outer surface connects to a first wall and a second wall that incline away from a convex inner surface of the collimator.

3. The vehicle as recited in claim 2, wherein the vehicle is a pickup truck and the truck bed establishes a cargo area of the pickup truck.

4. The vehicle as recited in claim 2, wherein the light source is a light emitting diode.

5. The vehicle as recited in claim 4, wherein the light emitting diode is received within a recess of the collimator.

6. The vehicle as recited in claim 2, wherein the collimator is a total internal reflection (TIR) collimator.

7. The vehicle as recited in claim 6, wherein the TIR collimator is configured to collect light generated by the light source and direct the light toward the outer lens.

8. The vehicle as recited in claim 2, wherein each of the plurality of fluted surfaces is pillow shaped.

9. The vehicle as recited in claim 2, wherein the plurality of flutes surfaces are configured to direct light at a downward angle relative to a centerline axis of the lens arrangement.

10. The vehicle as recited in claim 2, wherein the lens arrangement is supported within a housing.

11. The vehicle as recited in claim 10, comprising a second lens arrangement supported within the housing, wherein the lens arrangement directs light in a first direction from the housing and the second lens arrangement directs light in a second, different direction from the housing.

12. The vehicle as recited in claim 2, wherein the unitary body includes a molded, single-piece, monolithic structure.

13. A method, comprising:
   generating light with a light source of a lighting assembly mounted to a side wall of a truck bed;
   collecting the light within a total internal reflection collimator of the lighting assembly; and
   directing the light at a downward angle toward a floor of the truck bed with an outer lens of the lighting assembly,
   wherein the total internal reflection collimator includes a convex inner surface and a flat outer surface, and the flat outer surface connects to a first wall and a second wall that incline away from the convex inner surface.

14. The method as recited in claim 13, wherein the light from the light source is automatically generated when a tailgate of the truck bed is moved to an open position.

15. The method as recited in claim 14, wherein the light is turned off when the tailgate is moved to a closed position.

16. The method as recited in claim 13, comprising:
   illuminating a different section of the floor of the truck bed with a second truck bed lighting assembly.

17. The method as recited in claim 13, wherein the lighting assembly is mounted to an inner paneling of the side wall near a junction between the side wall and a tailgate.

18. A method, comprising:
   generating light with a light source of a lighting assembly mounted to a side wall of a truck bed;
   collecting the light within a total internal reflection collimator of the lighting assembly; and
   directing the light at a downward angle toward a floor of the truck bed with an outer lens of the lighting assembly,
   wherein an outer surface of the outer lens includes a plurality of pillow shaped fluted surfaces that are configured to direct the light at the downward angle.

* * * * *